United States Patent [19]
Keilbach

[11] Patent Number: 5,673,109
[45] Date of Patent: Sep. 30, 1997

[54] SYSTEM AND METHOD FOR INCREASING THE EFFICIENCY OF A RAMAN GAS ANALYSIS SYSTEM

[75] Inventor: Kevin A. Keilbach, Boulder, Colo.

[73] Assignee: Ohmeda Inc., Liberty Corner, N.J.

[21] Appl. No.: 678,642

[22] Filed: Jul. 10, 1996

[51] Int. Cl.$^6$ .................................. G01J 3/18; G01J 3/44
[52] U.S. Cl. .................................... 356/301; 356/328
[58] Field of Search ........................... 356/301, 326, 356/328, 331, 332, 333, 334

[56] References Cited

U.S. PATENT DOCUMENTS

| | | | |
|---|---|---|---|
| Re. 34,153 | 12/1992 | Benner et al. | 356/301 |
| 3,414,354 | 12/1968 | Siegler, Jr. | 356/301 |
| 4,676,639 | 6/1987 | Van Wagenen | 356/246 |
| 4,784,486 | 11/1988 | Van Wagenen et al. | 356/301 |
| 5,135,304 | 8/1992 | Miles et al. | 356/301 |
| 5,153,671 | 10/1992 | Miles | 356/301 |
| 5,233,405 | 8/1993 | Wildnauer et al. | 356/333 |
| 5,245,405 | 9/1993 | Mitchell et al. | 356/301 |
| 5,341,206 | 8/1994 | Pittaro et al. | 356/301 |
| 5,408,314 | 4/1995 | Perry et al. | 356/301 |
| 5,432,610 | 7/1995 | King et al. | 356/432 |
| 5,452,084 | 9/1995 | Mitchell et al. | 356/301 |
| 5,521,703 | 5/1996 | Mitchell | 356/301 |

FOREIGN PATENT DOCUMENTS 0 557 658  9/1993  European Pat. Off. .

OTHER PUBLICATIONS

Weber, et al., "High-Resolution Raman Spectroscopy of Gases With Laser Sources, V. Use of the Single-Mode Argon Laser", *Journal of the Optical Society of America*, vol. 62, No. 3, Mar. 1972, pp. 428–432.

Hickman et al., "Intracavity Laser Raman Spectroscopy Using a Commercial laser", *Applied Spectroscopy*, vol. 27, No. 6, 1973, pp. 425–427.

Hercher et al., "An Efficient Intracavity Laser Raman Spectrometer", *Applied Spectroscopy*, vol. 32, no. 3, 1978, pp. 298–301.

Neeley et al., "Moderification of a Commerical Argon Ion Laser for Enhancement of Gas Phase Raman Scattering", *Applied Spectroscopy*, vol. 26, No. 5, 1972, pp. 553–555.

Weber et al., "High–Resolution Raman Spectroscopy of Gases with cw–Laser Excitation", *Journal of the Optical Society of America*, vol. 57, No. 1, Jan. 1967, pp. 19–28.

Barrett et al., "Laser-Excited Rotation-Vibration Raman Scattering in Ultra-Small Gas Samples", *Journal of the Optical Society of America*, vol. 58, No. 3, Mar. 1968, pp. 311–319.

D.A. Long, *Raman Spectroscopy*, McGraw–Hill, New York, 1977, Ch. 6 "Experimental Procedures", pp. 132–145.

*Primary Examiner*—F. L. Evans
*Attorney, Agent, or Firm*—Roger M. Rathbun; Salvatore P. Pace; Dennis H. Epperson

[57] ABSTRACT

A Raman gas analysis system uses a half-wave plate to match the polarization of Raman scattered light emitted from a gas analysis cell to a preferred polarization orientation of a diffraction grating. The gas analysis system includes a plasma discharge tube for generating a polarized light beam; a gas analysis cell for containing a sample gas which produces Raman scattered light in response to being irradiated with the polarized light beam; an optical subsystem for collecting and providing the Raman scattered light with a preferred polarization orientation; a holographic diffraction grating for dispersing the Raman scattered light into component light signals; and an array detector for detecting the component light signals.

12 Claims, 3 Drawing Sheets

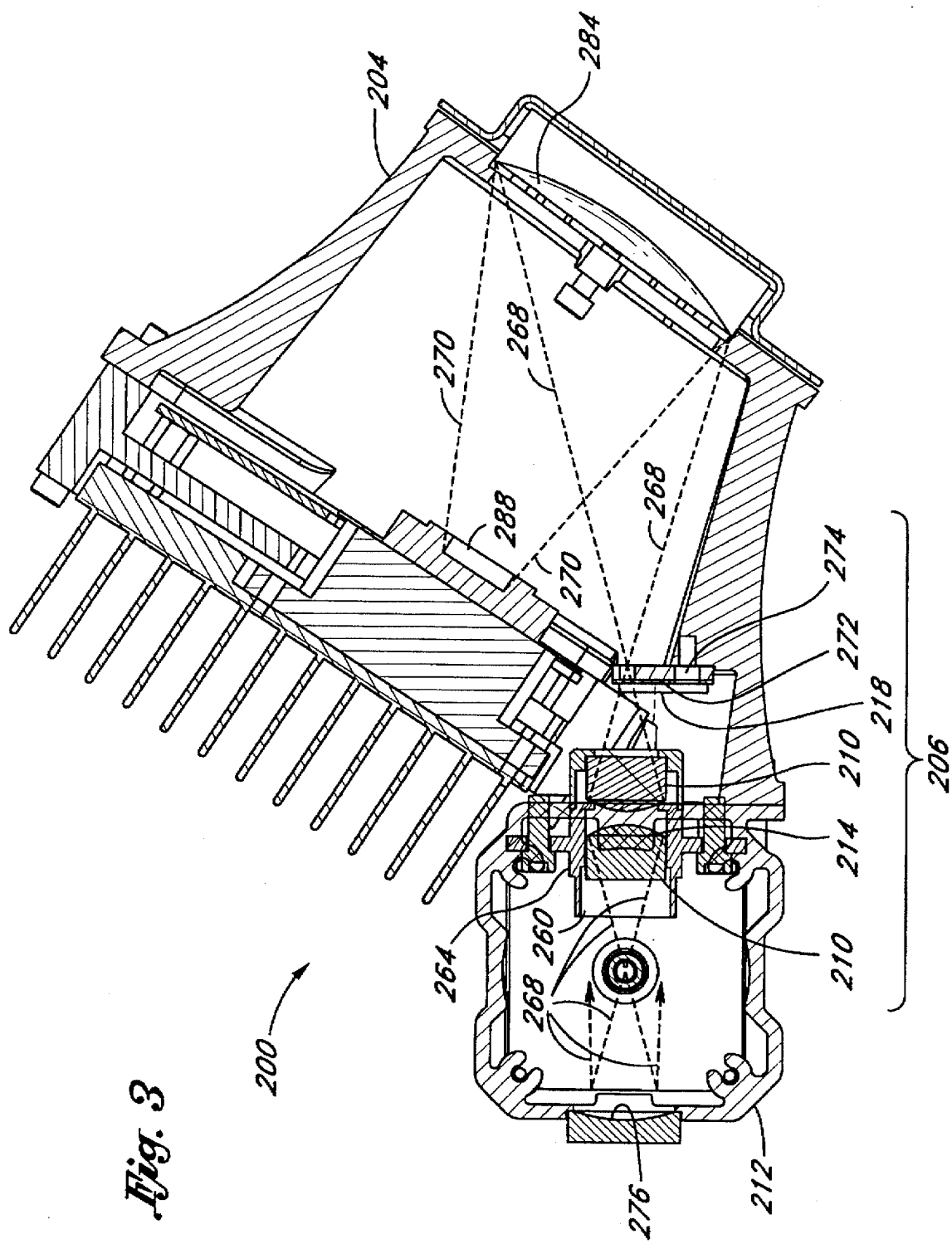

SYSTEM AND METHOD FOR INCREASING THE EFFICIENCY OF A RAMAN GAS ANALYSIS SYSTEM

FIELD OF THE INVENTION

The invention relates to the field of Raman spectroscopy, and more particularly, to a method and apparatus for increasing the efficiency of a Raman gas analyzer spectrometer by controlling the orientation of the polarization of light Raman scattered from a gas sample such that the polarization orientation of the Raman scattered light which is incident upon a diffraction grating optimizes the diffraction efficiency of the diffraction grating.

BACKGROUND OF THE INVENTION

Raman light scattering has been successfully used in critical care situations to continuously monitor a patient's respiratory gases. This technique is based on the effect which occurs when monochromatic light interacts with vibrational/rotational modes of gas molecules to produce scattered light which is frequency shifted from that of the incident radiation by an amount corresponding to the vibrational/rotational energies of the scattering gas molecules. If the incident light photon loses energy in the collision, it is re-emitted as scattered light with lower energy and consequently lower frequency than the incident photon. In a similar manner, if the incident photon gains energy in the collision, it is re-emitted as scattered light with higher energy and higher frequency than the incident photon. Since these energy shifts are species-specific, analysis of the various frequency components present in the Raman scattering spectrum of a sample provides chemical identification of the gases present in the scattering volume. The intensity of the various frequency components, i.e., Raman spectral lines, provides quantification of the gases present, providing suitable calibrations have been made. In this manner, Raman light scattering can be employed to determine the identity and quantity of various respiratory and anesthetic gases present in a patient's breath in operating room and intensive care situations.

Systems developed for analysis of gases in critical care situations utilizing Raman scattering typically employ gas cells which contain a sample of the patient's respiratory gas to be analyzed. One such system is described in U.S. Pat. No. 4,784,486, entitled "MULTI-CHANNEL MOLECULAR GAS ANALYSIS BY LASER-ACTIVATED RAMAN LIGHT SCATTERING", issued to Van Wagenen et al. Typically, the gas cell may be located either within the resonant cavity of a laser or outside the resonant cavity. In an intracavity system, such as that described by Van Wagenen, a laser beam is directed through a resonant cavity such that it intercepts a respiratory gas sample within a gas cell. An end mirror located at one end of the resonant cavity redirects light incident from a plasma discharge tube back through the resonant cavity, where it again passes through the gas cell and back into the plasma discharge tube. A Brewster prism may be mounted near the end mirror to select the desired wavelength and polarization state of the lasing light. Raman scattered light from the gas analysis region within the gas cell is collected by collection optics and directed through one or more interference filters or other means of wavelength discrimination. The collection optics and interference filters and possibly focusing optics in turn transmit the Raman scattered light to appropriate detectors for quantifying each specific Raman signal and thus each specific gas comprising the respiratory gas sample.

An alternative to using interference filters for wavelength discrimination is to employ a spectrometer type detector which utilizes a diffraction grating. The diffraction grating separates the various wavelength components of light Raman scattered from a gas sample. However, since the performance efficiency of a diffraction grating is dependent on the orientation of the polarization state (i.e., orientation of the electric field) of light incident on the grating, a need exists for a Raman gas analysis system wherein the orientation of the polarization state of Raman scattered light produced by scattering from a gas sample is controlled so as to optimize the performance efficiency of the diffraction grating.

SUMMARY OF THE INVENTION

The present invention provides a Raman gas analysis system which uses a half-wave plate to rotate the polarization of Raman scattered light emitted from a gas analysis cell to a preferred polarization orientation of a diffraction grating. The system comprises a laser for generating a light beam; a gas analysis cell in which a sample gas produces Raman scattered light in response to being irradiated with the laser light beam; an optical subsystem for collecting and transmitting the Raman scattered light and controlling the orientation of the polarization of the Raman scattered light; a holographic diffraction grating for dispersing, i.e. separating, the different wavelengths of light comprising the Raman scattered light; and an array detector for detecting the different wavelengths and intensities of light comprising the Raman scattered light.

In one embodiment, a concave holographic diffraction grating is used in a compact spectrometer for dispersing Raman scattered light from a gas sample located within a laser intracavity gas cell onto an array or CCD detector. The type and quantity of gas in the gas cell is determined from the spectral information received by the detector. Electrical signals produced by the array detector are proportional to the light levels received by each channel of the array detector. The diffraction grating has a diffraction efficiency which depends on the orientation of the polarization of light incident on the grating. Typically, the natural polarization of the Raman scattered light from the gas sample does not provide for optimum diffraction efficiency of the grating and hence optimum sensitivity of the gas monitor. Thus, a polymer sheet half-wave plate is inserted in the optical path before the diffraction grating to retard the phase of the electric field at one polarization orientation with respect to the phase of the electric field at the orthogonal orientation by one-half wavelength or by an odd integer multiple of one-half wavelength. This polarizer is placed in the light beam incident on the grating with its fast axis orientated at 45 degrees with respect to the incoming polarization to rotate the incoming polarization by 90 degrees. Since the diffraction grating has a higher average diffraction efficiency over the desired instrument operating wavelength range for light of this orthogonal polarization state than for light in the natural polarization state of the Raman scattering, the system provides more light to the detector resulting in a better signal to noise ratio and hence a lower gas detection threshold for the monitor.

In a first embodiment the present invention is a Raman gas analysis system which comprises: a source of polarized light for transmitting a beam of polarized light having a first polarization state along an optical axis, wherein the first polarization state is substantially perpendicular to the optical axis; a gas analysis cell positioned along the optical axis such that the beam of polarized light passes through a gas sample contained within the gas analysis cell, wherein the interaction of the polarized light beam with the gas sample produces Raman scattered light having wavelength and intensity characteristics determined by the composition of the gas sample; optics for collecting and focusing a portion of the Raman scattered light to form a beam of Raman scattered light having the first polarization state, the optics further directing the beam of Raman scattered light onto a spectrometer input slit, the spectrometer input slit having a longitudinal dimension which is substantially parallel to the optical axis; a polarization rotation element positioned in the beam of Raman scattered light such that the beam of Raman scattered light enters the polarization rotation element in the first polarization state and exits the polarization rotation element in a second polarization state; a diffraction grating for receiving the Raman scattered light in the second polarization state and for dispersing the beam of Raman scattered light in the second polarization state into a spectrum of wavelengths and intensities; and a detector for detecting the dispersed beam of Raman scattered light and generating an output signal which is representative of the spectrum of wavelengths and intensities comprising the dispersed beam of Raman scattered light. The optical axis and the optics may be configured such that the Raman scattered light beam is substantially perpendicular to the optical axis. Typically, the diffraction grating further comprises a plurality of substantially parallel closely spaced rulings which are substantially parallel to the optical axis. In this configuration, the polarization rotation element is oriented with respect to the diffraction grating rulings such that the second polarization state is substantially parallel to the diffraction grating rulings. The polarization rotation element may further comprise a half-wave plate and the diffraction grating may further comprise a concave holographic optical element.

In a second embodiment, the invention is a Raman gas analysis system which comprises: a laser for transmitting a beam of polarized light having a first polarization state along an optical axis, wherein the first polarization state is substantially perpendicular to the optical axis; a gas analysis cell positioned along the optical axis such that the beam of polarized light passes through a gas sample contained within the gas analysis cell, wherein the interaction of the polarized light beam with the gas sample produces Raman scattered light having wavelength and intensity characteristics determined by the composition of the gas sample, the gas analysis cell having a light output port for transmission of the Raman scattered light out of the gas analysis cell along a scattered light optical axis which is substantially perpendicular to the optical axis and the first polarization state; optics for collecting and focusing a portion of the Raman scattered light to form a beam of Raman scattered light having the first polarization state, the optics further directing the beam of Raman scattered light onto a spectrometer input slit, the spectrometer input slit having a longitudinal dimension which is substantially parallel to the optical axis; a polarization rotation element positioned in the beam of Raman scattered light such that the beam of Raman scattered light enters the polarization rotation element in the first polarization state and exits the polarization rotation element in a second polarization state, wherein the second polarization state is substantially perpendicular to the first polarization state; a diffraction grating for receiving the Raman scattered light in the second polarization state and for dispersing the beam of Raman scattered light in the second polarization state into a spectrum of wavelengths and intensities, wherein the diffraction grating includes a plurality of substantially parallel, closely spaced rulings which are substantially parallel to the optical axis; and a detector for detecting the dispersed beam of Raman scattered light and generating an output signal which is representative of the spectrum of wavelengths and intensities comprising the dispersed beam of Raman scattered light.

The invention further includes a method for analyzing a gas sample comprising: producing a beam of optical radiation having a first polarization state which propagates along a longitudinal axis; confining a gas sample in a region along the longitudinal axis so that the polarized beam of optical radiation propagates through the gas sample; forming a beam of Raman scattered light having the first polarization state which results from the interaction of the polarized beam of optical radiation with the gas sample; changing the first polarization state of the beam of Raman scattered light to a second polarization state; and analyzing the Raman scattered light having the second polarization state to identify and quantify the molecular species of gases comprising the gas sample. In the method, the analyzing step may further comprise directing the Raman scattered light having the second polarization state onto a diffraction grating having rulings which are substantially parallel to the longitudinal axis of the optical beam of radiation. Additionally, the method may further comprise selecting the second polarization state to maximize diffraction efficiency performance of the diffraction grating.

In a third embodiment, the invention is a Raman gas analysis system comprising: a source of polarized light for transmitting a beam of polarized light having a first polarization state along an optical axis, wherein the first polarization state is substantially perpendicular to the optical axis; a gas analysis cell positioned along the optical axis such that the beam of polarized light passes through a gas sample contained within the gas analysis cell, wherein the interaction of the polarized light beam with the gas sample produces Raman scattered light having wavelength and intensity characteristics determined by the composition of the gas sample; optics for collecting and focusing a portion of the Raman scattered light to form a beam of Raman scattered light having the first polarization state, the optics further directing the beam of Raman scattered light to a diffraction grating which receives the Raman scattered light in the second polarization state and disperses the beam of Raman scattered light in the second polarization state into a spectrum of wavelengths and intensities; a polarization rotation element positioned in the beam of Raman scattered light between the optics and the diffraction grating such that the beam of Raman scattered light enters the polarization rotation element in the first polarization state and exits the polarization rotation element in a second polarization state; and a detector for detecting the dispersed beam of Raman scattered light and generating an output signal which is representative of the spectrum of wavelengths and intensities comprising the dispersed beam of Raman scattered light.

These and other characteristics of the present invention will become apparent through reference to the following detailed description of the preferred embodiments and accompanying drawings.

BRIEF DESCRIPTION OF THE DRAWINGS

FIG. 3 is a cross-sectional view of the Raman gas analysis system of FIG. 2 taken along line 3—3.

Throughout the figures, like reference numbers refer to like elements.

DETAILED DESCRIPTION OF THE PREFERRED EMBODIMENTS

Figure 1:
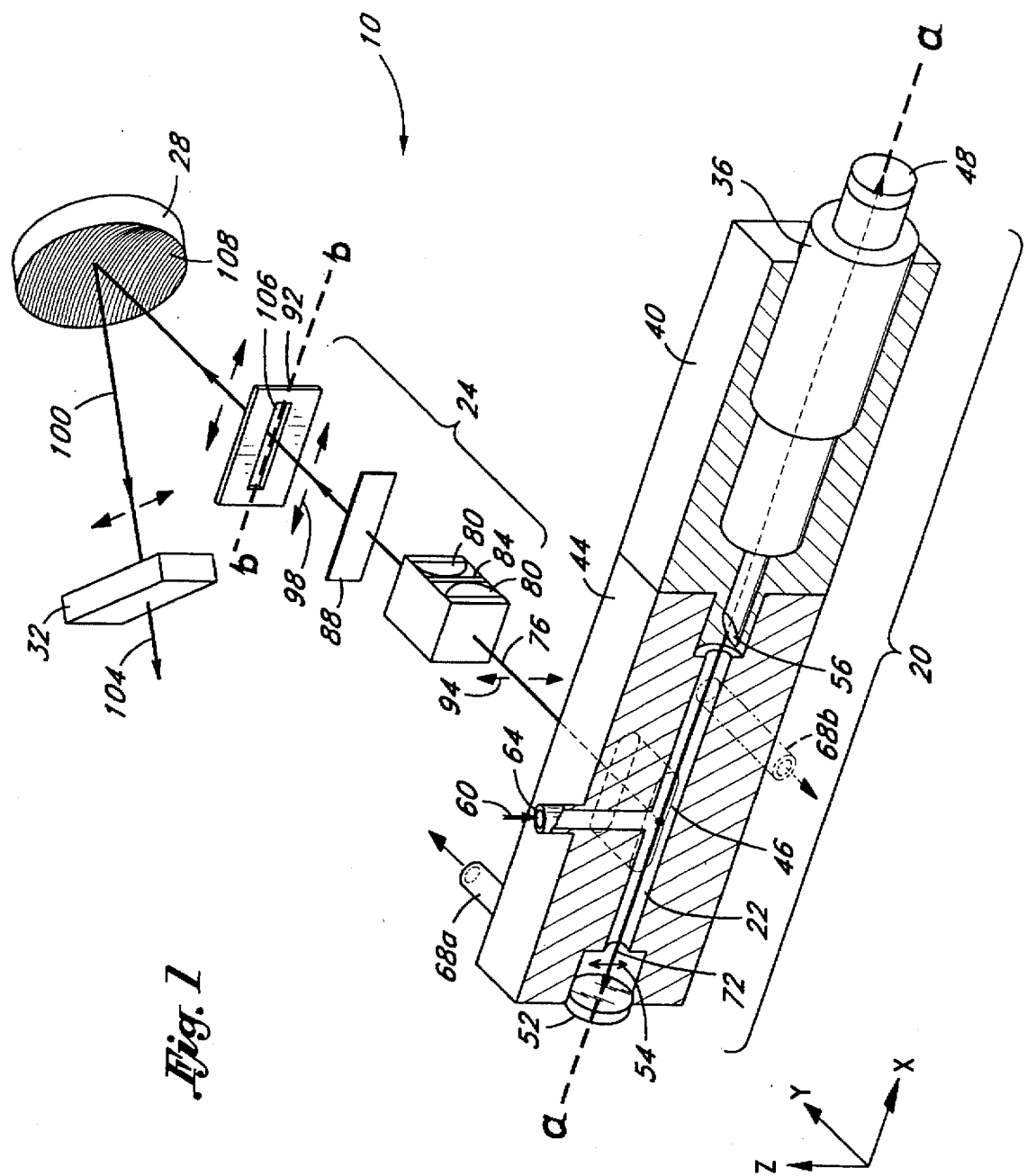
FIG. 1 is a schematic representation of a Raman gas analysis system embodying various features of the present invention.

The present invention provides a Raman spectroscopy system for identifying and quantifying the constituents of a gas sample based upon the spectral components and intensities of optical energy Raman scattered from the gas sample. FIG. 1 shows a Raman gas analysis spectroscopy system 10 generally comprising an optical resonant cavity 20 with a gas sample containment region 22 positioned therein, an optical subsystem 24, a holographic diffraction grating 28, and an array detector 32. The optical resonant cavity 20 includes a plasma discharge tube 36 mounted in a plasma discharge tube housing 40 and a gas analysis cell 44, including the gas sample containment region 22, positioned adjacent to and in axial alignment with the plasma discharge tube housing 40. The length of the optical resonant cavity 20 is defined by a first reflector 48 mounted near a proximate end of the plasma discharge tube 36 and a second reflector 52 mounted near a distal end of the gas analysis cell 44. The first and second reflectors 48 and 52 are optically aligned so that their optical axes are coincident along an optical axis a-a which is substantially parallel to the X-axis of the Raman gas analysis spectroscopy system 10 shown in FIG. 1. A Brewster window 56 seals a distal end of the plasma discharge tube 36 and is thus interposed between the first and second reflectors 48 and 52. A lasing gas (not shown) is confined within the plasma discharge tube 36. A sample gas 60 to be analyzed enters the gas sample containment region 22 of the gas analysis cell 44 through an inlet port 64 and exits the gas sample containment region 22 of the gas analysis cell 44 through outlet ports 68a and 68b. Gas analysis cell 44 further includes a light output port 46 through which a Raman scattered light beam 76, scattered out of a laser beam 72 circulating through the gas sample containment region 22, may be transmitted out of the gas analysis cell 44.

The laser beam 72 is produced by the plasma discharge tube 36, propagates through the Brewster window 56 and resonates within the optical resonant cavity 20 between the first and second reflectors 48 and 52 along the optical axis a-a. The Brewster window 56 selects a polarization state 54 of the laser beam 72. As shown in FIG. 1, the polarization state 54 of the laser beam 72 selected by the Brewster window 56 and circulating within the optical resonant cavity 20 is substantially parallel to the Z-axis of the Raman gas analysis spectroscopy system 10. Typically, the peak intensity of the Raman scattered light beam 76 occurs in a direction which is substantially perpendicular to the polarization state 54 of the laser beam 72.

Optical subsystem 24 receives, filters and focuses the Raman scattered light beam 76 resulting from the Raman scattering of laser beam 72 from the sample gas 60 contained in gas sample containment region 22 of the gas analysis cell 44. The optical subsystem 24 comprises collection optics 80, a laser line rejection filter 84, a half-wave plate 88 and a slit 106 formed in a slit plate 92. Collection optics 80 collect and focus the Raman scattered light beam 76 received from the gas sample containment region 22 of the gas analysis cell 44 onto the slit 106. Prior to incidence on the slit 106, the Raman scattered light beam 76 passes through the laser line rejection filter 84. The laser line rejection filter 84 blocks optical energy having the same wavelength as that of the laser beam 72. Thus, only wavelengths which are different from that of the laser beam 72 (e.g., light which has been Raman shifted by interaction of the laser beam 72 with the gas 60) are focused onto the slit 106.

Upon exiting the light output port 46, the Raman scattered light beam 76 has a polarization state 94 which is substantially the same as the polarization state 54 of the laser beam 72 circulating in the optical resonant cavity 20, i.e., substantially parallel to the Z-axis. The half-wave plate 88 is preferably oriented so that its fast axis is oriented at 45 degrees with respect to the polarization state 94 of the Raman scattered light beam 76. Thus, after passing through the half-wave plate 88, the Raman scattered light beam 76 has a polarization state 98 which is substantially perpendicular to the polarization state 54 of laser beam 72. (Generally, a half-wave plate retards the polarization orientation of a light signal with respect to the orthogonal orientation by one-half wavelength or by integral multiples of one-half wavelength.) By way of example, the half-wave plate 88 may be implemented as a polymer sheet polarizer. Thus, after passing through the half-wave plate 88, Raman scattered light beam 76 having polarization state 98 passes through slit 106. The slit 106 has a longitudinal axis b-b which is substantially parallel to the optical axis a-a of laser beam 72 to maximize the intensity of the Raman scattered light beam 76 which is transmitted to the diffraction grating 28.

After exiting the slit 106, Raman scattered light beam 76 is received by the reflecting holographic diffraction grating 28. The reflecting holographic diffraction grating 28 disperses the Raman scattered light beam 76 into discrete wavelength light signals 100, which, when combined together, comprise the Raman scattered light beam 76. The reflecting holographic diffraction grating 28 generally includes diffraction grating grooves or rulings 108, which preferably are parallel to the axis b-b of the slit 106. Reflecting holographic diffraction grating 28 reflects and focuses the dispersed light signals 100 onto the array detector 32.

The identification of the wavelengths and intensities of the discrete wavelength light signals 100 comprising Raman scattered light beam 76 are analyzed to determine the identity and concentration of the gases comprising the gas sample 60. The array detector 32 converts the discrete wavelength light signals 100 into an electrical output signal 104 which represents the intensities of the various light components comprising the discrete wavelength light signals 100 that are detected by the various channels of the array detector 32. The electrical output signal 104 may be analyzed using the techniques of Raman spectroscopy to determine the identities and concentrations of the constituents of sample gas 60.

Thus, matching the polarization 98 of the Raman scattered light beam 76 to the preferred polarization orientation of the diffraction grating 28 (i.e., polarization 98 of the Raman scattered light beam 76 parallel to the diffraction grating rulings 108) provides the diffraction grating 28 with a higher average diffraction efficiency compared to the diffraction efficiency of the diffraction grating 28 for Raman scattered light having the polarization of the laser beam 72 (i.e., polarization 54 of the Raman scattered light beam 76 perpendicular to the diffraction grating rulings 108). A more detailed description of a Raman gas analysis system is presented in U.S. Pat. No. 4,784,486, entitled "MULTI-CHANNEL MOLECULAR GAS ANALYSIS BY LASER-ACTIVATED RAMAN LIGHT SCATTERING", issued to Van Wagenen et al., assigned to the assignee of the present application and incorporated herein by reference. Further detailed descriptions of various aspects of Raman Gas Analysis systems are disclosed in commonly assigned U.S. Pat. No. 5,135,304, entitled "GAS ANALYSIS SYSTEM HAVING BUFFER GAS INPUTS TO PROTECT ASSOCIATED OPTICAL ELEMENTS", issued to Miles et al.; U.S. Pat. No. 5,153,671, entitled "GAS ANALYSIS SYSTEM HAVING BUFFER GAS INPUTS TO PROTECT ASSOCIATED OPTICAL ELEMENTS", issued to Miles; U.S. Pat. No. 5,245,405, entitled "CONSTANT PRESSURE GAS CELL", issued to Mitchell et al.; U.S. Pat. No. 5,521,703, entitled "DIODE LASER PUMPED RAMAN GAS ANALYSIS SYSTEM WITH REFLECTIVE HOLLOW TUBE GAS CELL", issued to Mitchell; and U.S. patent application Ser. No. 08/366,840, entitled "RAMAN GAS ANALYSIS SYSTEM WITH PRECISION OPTICAL ALIGNMENT FEATURES", each of which is hereby incorporated herein by reference.

Figure 2:
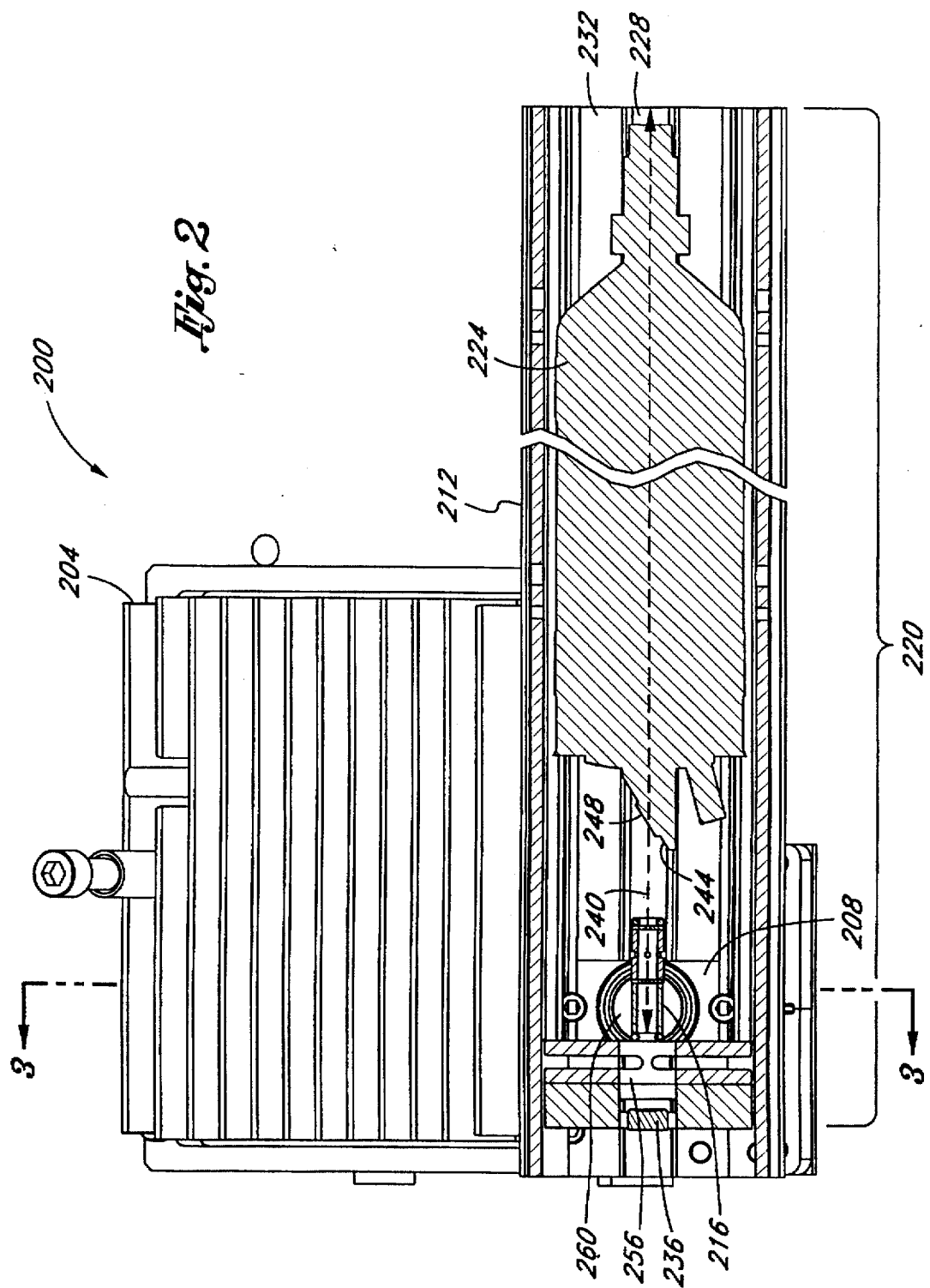
FIG. 2 is a cross-sectional view of an one embodiment of a Raman gas analysis system of the type illustrated in FIG. 1.

Referring to FIG. 2, there is shown a cross-sectional view of an example of a Raman gas analysis system 200 embodying various features of the present invention. Raman gas analysis system 200 includes a detector unit 204, a gas sample cell subsystem 208, and a plasma tube/gas sample cell housing 212. The gas sample cell subsystem 208 includes sample gas inlet and outlet ports (not shown) by which a gas sample may be admitted and exhausted from a transparent gas sample cell 216 mounted in the gas sample cell subsystem 208.

FIG. 3 is a cross-sectional view of the Raman gas analysis system 200 taken along line 3—3 of FIG. 2. Referring to FIGS. 2 and 3, the gas sample cell subsystem 208 is positioned within a laser resonant cavity 220 comprising an optical gain system, such as a plasma discharge tube 224, a first mirror 228 mounted at a proximal end 232 of the plasma discharge tube 224 and a second mirror 236 mounted near a distal end of gas sample cell 208 and optically aligned with the first mirror 228.

The plasma discharge tube 224 generates and emits a light beam 240 which resonates within the resonant cavity 220 between the mirrors 228 and 236, thereby defining a laser. By way of example, the plasma discharge tube 224 may be implemented as a Helium-Neon plasma discharge tube sealed by the first mirror 228 at end 232 and by a Brewster window 248 at a distal end 244. The first mirror 228 is integrally mounted to the plasma discharge tube 224 in a pre-aligned, sealed configuration. The Brewster window 248 selects a single polarization state for the light beam 240. Plasma discharge tubes suitable for use in the present invention may be of the type commercially available from Melles Griot Electro-Optics Division in San Diego, Calif., such as Model No. 05-LHB-566. While the description of the plasma discharge tube 224 is described above as a Helium-Neon plasma discharge tube, it is to be understood that the optical gain system alternatively may be implemented using other types of lasers, e.g., gas lasers, solid-state lasers or laser diodes.

As illustrated in FIG. 2, the plasma tube housing 212 is mounted to the gas sample cell subsystem 208 using a gas-tight, interference fit which preferably may be of the type described in co-pending U.S. patent application Ser. No. 08/366,840, filed Dec. 30, 1994, entitled "Raman Gas Analysis System with Precision Optical Alignment Features," incorporated herein by reference, and assigned to the assignee of the present application. The second mirror 236 preferably is mounted on a precision optical positioning system 256 mounted to the end of the gas sample cell 208, as for example, by threaded screws, not shown. The precision optical positioning system 256 preferably may be of the type described in co-pending U.S. patent application Ser. No. 08/366,840, filed Dec. 30, 1994, entitled "Raman Gas Analysis System with Precision Optical Alignment Features", referenced herein above. The precision optical alignment system 256 is adjustable to provide extremely precise angular adjustments of the position of the second mirror 236 to optimize resonance of the light beam 240 in the resonant cavity 220.

The reflectivity of the second mirror 236 of the laser resonant cavity 220 may be such that light loss from the system 200 is in the range of about 1000 parts per million (ppm) to 2500 ppm. This loss level provides light beam 240 sufficient power to provide an adequate Raman signal, while obviating the need to place a prism in front of the second mirror 236 so that the light beam 240 incident on the mirror 236 substantially comprises a single lasing wavelength.

As shown in FIGS. 2 and 3, the gas sample cell subsystem 208 is provided with a light output port 260. An optical subsystem 206 gathers light signals 268 emitted from the gas cell 216 that are directed to the light output port 260. Optical subsystem 206 directs the light signals 268 to an entrance slit 272 of the detector unit 204. Preferably, the slit 272 is rectangularly shaped having a longitudinal axis which is parallel to the light beam 240. Mirror 276 mounted to the side of plasma tube housing 212 opposite the light output port 260 also reflects incident light signals 268 towards the optical subsystem 206 to increase the signal strength of the light signals 268 which are focused on the entrance slit 272.

The optical subsystem 206 comprises collection optics 210, a laser line rejection filter 214 (i.e., a Rayleigh filter), half-wave plate 218, and slit plate 274 in which is formed the rectangular aperture slit 272. Optical subsystem 206 collects and focuses optical signals 268 from gas sample cell 216, and then directs optical signals 268 through laser line rejection filter 214. The laser line rejection filter 214 is included in the optical path between the light output port 260 and the entrance slit 272 to filter out scattered light having the same wavelength as that of the light beam 240 circulating within the laser resonant cavity 220. Thus, only optical components resulting from Raman shifting caused by interaction of the gas sample with the light beam 240 are transmitted to the detector unit 204. As previously described in reference to FIG. 1, the half-wave plate 218 is oriented so that its fast axis is oriented at 45 degrees with respect to the polarization state of the light beam 240. Thus, after passing through the half-wave plate 218, light signals 268 which have a polarization state that is perpendicular to the polarization state of light beam 240 are focused onto the slit 272 in slit plate 274. The longitudinal axis (not shown) of the rectangular slit 272 is oriented parallel to the propagation axis of light beam 240. The detector unit 204 further includes a reflecting holographic grating 284 and an array detector 288. The reflecting holographic diffraction grating 284 generally includes diffraction grating grooves or rulings 108 (See FIG. 1), which are parallel to the axis of the slit 272. In one embodiment of the system 200, the holographic grating 284 may be approximately 50 mm in diameter, and have a focal length of approximately 100 mm and a groove density of 1110 grooves/mm. Such a grating may be purchased from American Holographic, in Littleton, Mass. as Part No. 491.75.

In operation, Raman scattered light signals 268 scattered by the gas sample contained in the gas sample cell 216 pass through the light output port 260 and are collected, filtered, polarization rotated and focused onto the entrance slit 272 by the collection optics 264 and laser line rejection filter 280. After passing through the entrance slit 272, the Raman scattered light signals 268 are incident on the reflecting holographic grating 284. Typically, the Raman scattered light signals 268 comprise a plurality of discrete wavelengths. The reflecting holographic grating 284 separates the plurality of discrete wavelengths comprising light signals 268 into discrete wavelength light signals 270. The discrete wavelength light signals 270 are reflected and focused by the reflecting holographic grating 284 onto the array detector 288. The half-wave plate 218 transforms the polarization state of the Raman scattered light signals 268 into an orthogonal polarization state which preferably is parallel to the diffraction grating grooves of the reflecting holographic grating 284 and perpendicular to the polarization state of the light beam 240. Matching the polarization of the light signals 268 to the polarization orientation of the grooves of the diffraction grating 284 provides the grating 284 with a higher average diffraction efficiency over the desired wavelength detection range of light signals 268 compared to the diffraction efficiency of the grating for Raman scattered light having the polarization state of the light beam 240.

CCD detector 288 advantageously converts light signals 270 into signals which are indicative of the intensities of the discrete wavelength light signals 270 comprising light signals 268. The CCD detector 288 may be implemented as an 512×128 pixel device. Such a CCD detector may be purchased from Hamamatsu Photonics KK, Hamamatsu City, Japan, as a single, hermetically-sealed package which includes a single-stage thermoelectric (TE) cooler as part number S5769-0907.

It is to be understood that the present invention provides a method and system for enhancing the diffraction efficiency of a Raman gas analysis system. In light of these teachings, numerous other embodiments of the invention may become obvious to one skilled in the art. Thus, the system and method of the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A Raman gas analysis system comprising:
    a laser having a resonant cavity which produces and transmits a beam of polarized light having a first polarization state along an optical axis of said resonant cavity, wherein said first polarization state is substantially perpendicular to said resonant cavity optical axis;
    a gas analysis cell positioned within said laser resonant cavity along said resonant cavity optical axis such that said beam of polarized light passes through a gas sample contained within said gas analysis cell, wherein the interaction of said polarized light beam with said gas sample produces Raman scattered light having wavelength and intensity characteristics determined by the composition of said gas sample;
    optics for collecting and focusing a portion of said Raman scattered light to form a beam of Raman scattered light having said first polarization state, said optics further directing said beam of Raman scattered light onto a spectrometer input slit, said spectrometer input slit having a longitudinal dimension which is substantially parallel to said resonant cavity optical axis;
    a polarization rotation element positioned in said beam of Raman scattered light such that said beam of Raman scattered light enters said polarization rotation element in said first polarization state and exits said polarization rotation element in a second polarization state;
    a diffraction grating for receiving said Raman scattered light in said second polarization state and for dispersing said beam of Raman scattered light in said second polarization state into a spectrum of wavelengths and intensities; and
    a detector for detecting said dispersed beam of Raman scattered light and generating an output signal which is representative of said spectrum of wavelengths and intensities comprising said dispersed beam of Raman scattered light.

2. A Raman gas analysis system as defined in claim 1 wherein said resonant cavity optical axis and said optics are configured such that said Raman scattered light beam is substantially perpendicular to said resonant cavity optical axis.

3. A Raman gas analysis system as defined in claim 1 wherein said diffraction grating further comprises a plurality of substantially parallel closely spaced rulings which are substantially parallel to said resonant cavity optical axis.

4. A Raman gas analysis system as defined in claim 3 wherein said polarization rotation element is configured with respect to said diffraction grating rulings such that said second polarization state is substantially parallel to said diffraction grating rulings.

5. A Raman gas analysis system as defined in claim 1 wherein said polarization rotation element further comprises a half-wave plate.

6. A Raman gas analysis system as defined in claim 1 wherein said diffraction grating further comprises a concave holographic optical element.

7. A Raman gas analysis system comprising:
    a laser having a resonant cavity, wherein said laser produces and transmits a beam of polarized light having a first polarization state along an optical axis of said resonant cavity, wherein said first polarization state is substantially perpendicular to said resonant cavity optical axis;
    a gas analysis cell positioned within said resonant cavity along said resonant cavity optical axis such that said beam of polarized light passes through a gas sample contained within said gas analysis cell, wherein the interaction of said polarized light beam with said gas sample produces Raman scattered light having wavelength and intensity characteristics determined by the composition of said gas sample, said gas analysis cell having a light output port for transmission of said Raman scattered light out of said gas analysis cell and said resonant cavity along a scattered light optical axis which is substantially perpendicular to said resonant cavity optical axis and said first polarization state;
    optics for collecting and focusing a portion of said Raman scattered light to form a beam of Raman scattered light having said first polarization state, said optics further directing said beam of Raman scattered light onto a spectrometer input slit, said spectrometer input slit having a longitudinal dimension which is substantially parallel to said resonant cavity optical axis;
    a polarization rotation element positioned in said beam of Raman scattered light such that said beam of Raman scattered light enters said polarization rotation element in said first polarization state and exits said polarization rotation element in a second polarization state, wherein said second polarization state is substantially perpendicular to said first polarization state;

a diffraction grating for receiving said Raman scattered light in said second polarization state and for dispersing said beam of Raman scattered light in said second polarization state into a spectrum of wavelengths and intensities, wherein said diffraction grating includes a plurality of substantially parallel, closely spaced rulings which are substantially parallel to said resonant cavity optical axis; and a detector for detecting said dispersed beam of Raman scattered light and generating an output signal which is representative of said spectrum of wavelengths and intensities comprising said dispersed beam of Raman scattered light.

8. A method for analyzing a gas sample comprising:

providing a laser having a resonant cavity for producing a beam of polarized optical radiation having a first polarization state which propagates along a longitudinal axis of said resonant cavity;

confining a gas sample in a region of said resonant cavity along said resonant cavity longitudinal axis so that said polarized beam of optical radiation propagates through said gas sample;

forming a beam of Raman scattered light having said first polarization state which results from the interaction of said polarized beam of optical radiation with said gas sample in said resonant cavity;

changing said first polarization state of said beam of Raman scattered light to a second polarization state; and analyzing said Raman scattered light having said second polarization state to identify and quantify the molecular species of gases comprising said gas sample.

9. A method as defined in claim 8 wherein said analyzing step further comprises directing said Raman scattered light having said second polarization state onto a diffraction grating having rulings which are substantially parallel to said resonant cavity longitudinal axis.

10. A method as defined in claim 9 further comprising selecting said second polarization state to maximize diffraction efficiency performance of said diffraction grating.

11. A Raman gas analysis system comprising:

a laser having a resonant cavity which produces and transmits a beam of polarized light having a first polarization state along an optical axis of said resonant cavity, wherein said first polarization state is substantially perpendicular to said resonant cavity optical axis;

a gas analysis region positioned within said laser resonant cavity along said resonant cavity optical axis such that said beam of polarized light passes through a gas sample contained within said gas analysis region of said resonant cavity, wherein the interaction of said polarized light beam with said gas sample produces Raman scattered light having wavelength and intensity characteristics determined by the composition of said gas sample;

optics for collecting and focusing a portion of said Raman scattered light to form a beam of Raman scattered light having said first polarization state, said optics further directing said beam of Raman scattered light to a diffraction grating which receives said Raman scattered light and disperses said beam of Raman scattered light into a spectrum of wavelengths and intensities;

a polarization rotation element positioned in said beam of Raman scattered light between said optics and said diffraction grating such that said beam of Raman scattered light enters said polarization rotation element in said first polarization state and exits said polarization rotation element in a second polarization state; and a detector for detecting said dispersed beam of Raman scattered light and generating an output signal which is representative of said spectrum of wavelengths and intensities comprising said dispersed beam of Raman scattered light.

12. A Raman gas analysis system comprising:

a laser having a resonant cavity, wherein said laser produces and transmits a beam of polarized light having a first polarization state along an optical axis of said resonant cavity, wherein said first polarization state is substantially perpendicular to said resonant cavity optical axis;

a gas analysis cell positioned within said resonant cavity along said resonant cavity optical axis such that said beam of polarized light passes through a gas sample contained within said gas analysis cell, wherein the interaction of said polarized light beam with said gas sample produces Raman scattered light having wavelength and intensity characteristics determined by the composition of said gas sample, said gas analysis cell having a light output port for transmission of said Raman scattered light out of said gas analysis cell and said resonant cavity along a scattered light optical axis which is substantially perpendicular to said resonant cavity optical axis and said first polarization state;

optics for collecting and focusing a portion of said Raman scattered light to form a beam of Raman scattered light having said first polarization state, said optics further directing said beam of Raman scattered light onto a spectrometer input slit, said spectrometer input slit having a longitudinal dimension which is substantially parallel to said resonant cavity optical axis;

a half wave plate polarization rotation element positioned in said beam of Raman scattered light intermediate said gas analysis cell light output port and said spectrometer input slit such that said beam of Raman scattered light enters said half wave plate polarization rotation element in said first polarization state and exits said polarization rotation element in a second polarization state, wherein said second polarization state is substantially perpendicular to said first polarization state;

a concave holographic diffraction grating for receiving said Raman scattered light in said second polarization state and for dispersing and focusing said beam of Raman scattered light in said second polarization state into a spectrum of wavelengths and intensities, wherein said concave holographic diffraction grating includes a plurality of substantially parallel, closely spaced rulings which are substantially parallel to said resonant cavity optical axis and said second polarization state;

a CCD detector for receiving and detecting said dispersed and focused beam of Raman scattered light from said concave holographic diffraction grating and generating an output signal which is representative of said spectrum of wavelengths and intensities comprising said dispersed beam of Raman scattered light; and a thermoelectric cooler attached to said CCD detector for cooling said CCD detector.

* * * * *